United States Patent

[11] 3,626,188

[72] Inventor George E. Chilton
144 Valley Road, Haworth, N.J. 07641
[21] Appl. No. 773,141
[22] Filed Nov. 4, 1968
[45] Patented Dec. 7, 1971

[54] LIGHT DETECTOR EMPLOYING NOISE QUENCHING OF AVALANCHE DIODES
2 Claims, 3 Drawing Figs.

[52] U.S. Cl. .......... 250/83.3 R, 250/83.3 H, 250/83.3 UV, 250/211 J
[51] Int. Cl. .......... G01t 1/16
[50] Field of Search .......... 250/83.3, 83.3 IR, 83.3 UV, 211 J; 317/235/30; 331/78; 307/311

[56] References Cited
UNITED STATES PATENTS

| | | | |
|---|---|---|---|
| 2,991,366 | 7/1961 | Salzberg | 250/83.3 |
| 3,110,806 | 11/1963 | Denney et al. | 250/83.3 |
| 3,126,483 | 3/1964 | Hoalst | 250/83.3 |
| 2,952,817 | 9/1960 | Kennedy | 331/78 X |
| 3,209,279 | 9/1965 | Kambouris | 331/78 |
| 3,403,306 | 9/1968 | Haitz et al. | 317/235 |
| 3,412,252 | 11/1968 | Grimmeiss | 250/83.3 X |
| 3,417,253 | 12/1968 | Kadah et al. | 250/239 X |

*Primary Examiner*—James W. Lawrence
*Assistant Examiner*—Davis L. Willis
*Attorney*—Darby & Darby

ABSTRACT: The semiconductor diode devices are operated in an avalanche mode. The diode is subjected to external light energy. The degree of the resulting reduction in noise is a function of the light intensity.

GEORGE C. CHILTON
INVENTOR.

BY Leonard H. King
ATTORNEY

LIGHT DETECTOR EMPLOYING NOISE QUENCHING OF AVALANCHE DIODES

This invention relates to a quantum energy detecting device and more specifically to a solid-state means for detecting the presence of infrared light energy.

BACKGROUND OF THE INVENTION

Detectors of electromagnetic radiation may be classified broadly into quantum detectors, resonant detectors and heat engines or thermal detectors. The first are devices which convert a quantum of the radiation in question into a proportionate signal by some process which is insensitive to quanta of less than a certain energy (for example, the mean energy of quanta emitted by a body at room temperature). Photographic emulsions, photoelectric cells, and Geiger counters are examples of quantum detectors. Heat engines act as detectors by converting the radiation into heat and using the heat to operate a device that produces a signal that is proportionate to the amount of radiant energy received.

For the photoelectric infrared quantum detectors in the form of specially sensitized photographic emulsions, photoemissive cells and particularly photoconductive cells are usable. The responsivity of such detectors varies considerably with frequency and drops to low values at wave numbers of about 2,000–3,000 $cm.^{-1}$ (3.5–5 $\mu$ in wavelength). Photoconductive detectors are known having good responsivity below 2,000 $cm.^{-1}$ (above 5 $\mu$), but these must be operated at or near liquid helium temperatures ($<10^\circ$ K.).

Therefore, in a large part of the infrared region, heat-engine detectors whose responsivity is the same to all kinds of radiation provided the radiation is converted entirely to heat in the detector, are the only generally usable kind. Examples of heat-engine detectors are thermocouples and thermopiles, which produce an e.m.f. when heated; bolometers, which change their electrical resistance when heated; and pneumatic radiometers, in which heat is detected by the increase in pressure of a heated gas. Because these devices are all subject to the laws of thermodynamics governing the conversion of heat into useful work (that is, into a signal), their ultimate responsivity is expected to be approximately the same and this is found to be the case. Thermal detectors operating at room temperature have a lower limit of sensitivity of the order of $10^{-10}$ watt with response times of the order of 0.1 sec. This limit can be considerably reduced if the detector is capable of operation at low temperature.

The present invention is directed to a new form of quantum detector which utilizes a zener or avalanche diode in a heretofore unknown mode of operation. Currently such devices are used in electronic circuits to produce a stable reference voltage. The voltage breakover is a characteristic of the composition of the semiconductor material utilized, and will occur at different voltages for different materials. In order to accomplish this effect, the voltage is applied in the reversed or back direction which normally retards the easy or free flow of current. When the voltage reaches the avalanche point, current will flow through the device and will increase at a rapid rate, avalanching with small incremental changes in voltage.

When semiconductors such as diodes and transistors are exposed to light, a photoresistive effect occurs. This phenomenon is undesirable from reference or zener diode point of view. To eliminate this effect, it has been the practice to apply a coating of opaque paint to the diode to shield the semiconductor material from any source of light. When completed diodes were tested in the avalanche region and exhibited a high noise characteristic, they were discarded as unusable. They could not be used in voltage regulation applications solely because of the noise phenomenon.

During an investigation of these rejected units to determine the cause of high nose output, it was found that they were extremely sensitive to light an in particular to infrared light, e.g., light energy would reduce the output noise level from several millivolts to a fraction of a microvolt. Thus the high level noisy diodes could be used as energy detectors. The advantages of the "zener" diode as a detector becomes immediately apparent when one considers the small size, a typical diode having a major dimension of but 0.010 inch. The small size permits arrays of matrixes. Further such devices can operate at room temperature.

Heretofore, devices used to detect infrared light were bulky, expensive and did not lend themselves to small or tight packaging where temperature variations or sharp gradients could be determined with any degree of accuracy. Several of the older devices contained moving parts, were costly to repair and were inaccurate and insensitive to small variations in temperature.

BRIEF SUMMARY OF THE INVENTION

A zener or avalanche diode is biased to operate in an avalanche noise mode. When exposed to a source of ultraviolet, visible and infrared energy, the avalanche noise is quenched. Suitable circuits are used to detect the change in noise level. The noise varies inversely with the quantity of received energy.

Accordingly, the primary object of this invention is to provide a small, inexpensive, solid-state device for the detecting of infrared radiation.

Another object of this invention is to provide a device extremely sensitive to low levels of infrared radiation and capable of providing a usable output which, when acted upon by auxiliary amplifiers, will accurately measure the amount of radiation.

A further object of this invention is to provide a small infrared detecting device which, when used in a matrix network, with suitable amplifiers and display devices, yields an instantaneous picture of the heat distribution of the object under surveillance.

Another object of this invention is to provide a miniature infrared detecting device which, when used in conjunction with suitable amplifiers and output devices, will detect small increases of temperature to satisfy critical temperature measuring requirements.

A particular object of the invention is to provide a light quenched semiconductor noise generator.

Another object of the invention is to provide a miniature infrared radiation detector.

Another object of this invention is to provide a miniature infrared detecting device which, when used with the proper amplifiers and means of propulsion, seek out a prescribed temperature source from a larger background of cooler sources.

The foregoing and other objects and advantages of the invention will become more apparent from the following description and accompanying drawing forming part of this application.

Figure 1:
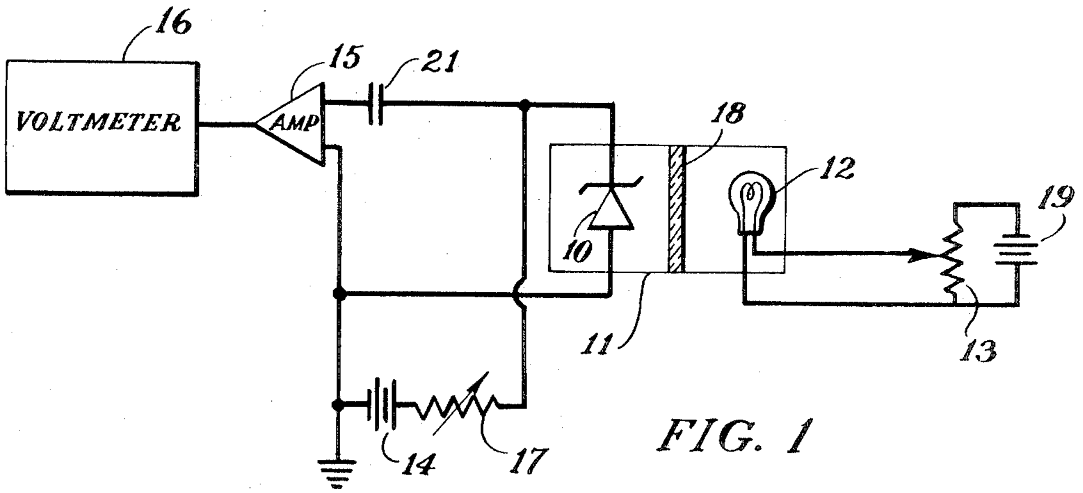
FIG. 1 is an electrical schematic for an energy detection device.

Referring to the drawing there is shown an infrared diode detector 10 enclosed in an opaque enclosure 11 which prevents light from entering. Within said enclosure there is provided a source of light and infrared radiation such as in incandescent lamp 12. The light source is connected to an external variable source of voltage, such as battery 19 and voltage divider 13. An external DC bias source 14 is connected to the infrared diode detector 10. In addition, a broadband amplifier 15 capable of amplifying white noise is coupled to the diode detector. The output of the amplifier is connected to an AC voltmeter 16 capable of reading the broadband noise.

Figures 2, 3:
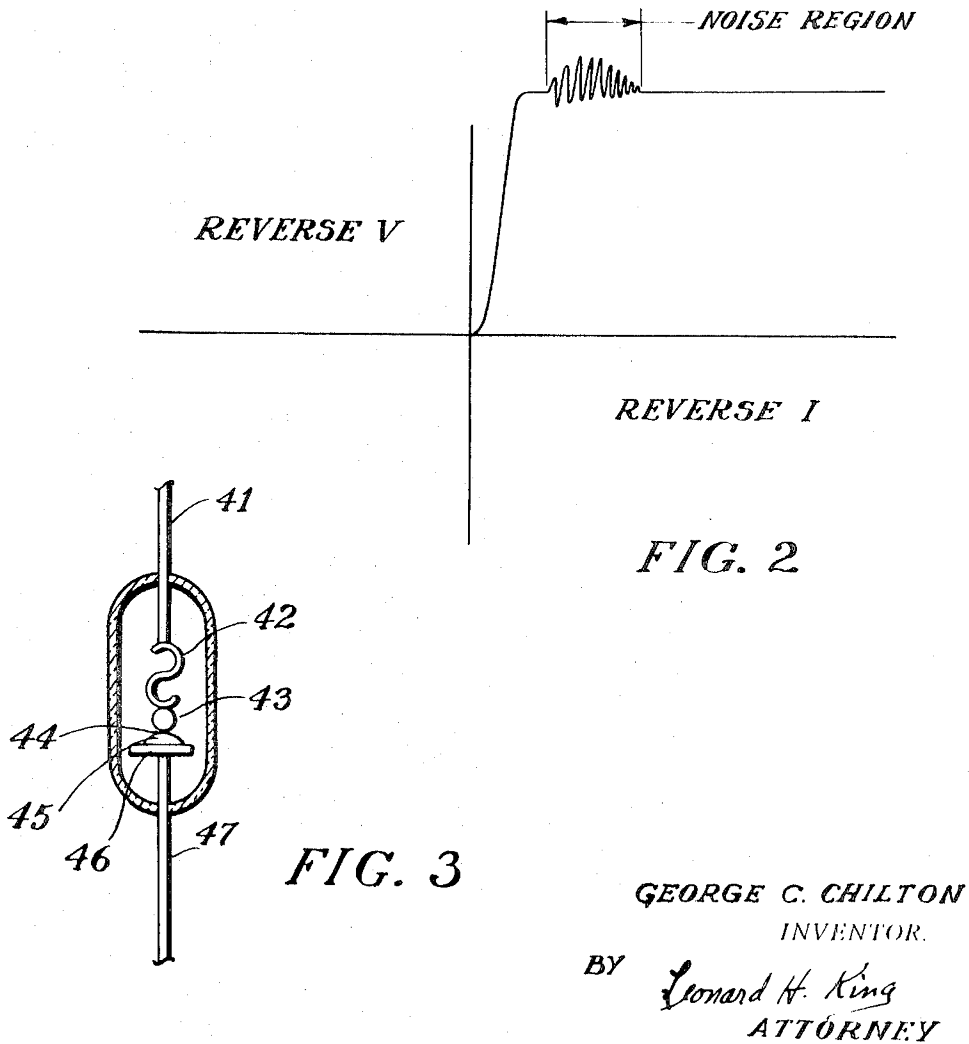
FIG. 2 is a plot of the diodes' characteristics showing the point at which the noise phenomenon occurs.
FIG. 3 is an elevational view of a semiconductor-type detector.

A variable resistor 17 is placed in series with the DC bias source 14 to enable the bias current and voltage to be adjusted on the infrared diode detector 10, to the avalanche noise region (FIG. 2). The DC blocking capacitor 21 couples the noise energy output from said detector to amplifier 15 whose noise level output is read on voltmeter 16. In one experiment, the voltage to said light source was increased until the voltmeter reading dropped which showed noise quenching occured. Visible light from the lamp was prevented from reaching the lamp by means of a filter 18 effective for the ultraviolet and visible portion of the spectrum.

Using a calibrated infrared energy source, the experiment was repeated and it was found that there was a relationship between the intensity of the radiation and degree of quenching of the noise.

Using the apparatus of FIG. 1, with the visible light filter replaced with an infrared filter, the experiment was repeated and it was found that visible light would also serve to quench the noise.

The bias current should be maintained constant.

If the light source is modulated, then the noise output would be modulated and the modulation can be detected.

The device may be packaged in a type DO–7 glass envelope 40 as shown in FIG. 3. The envelope contains an anode lead 41, an S-bend 42 for contact to ohmic contact 43, the junction 44 of the silicon chip 45 which is attached to metal tab 46 carried by the cathode lead 47.

Having thus disclosed the best embodiment of the invention presently contemplated, it is to be understood that various changes and modifications may be made by those skilled in the art without departing from the spirit of the invention.

What I claim as new and desire to secure by letters patent is:

1. A method of detecting light energy in the ultraviolet, visible and infrared portions of the electromagnetic spectrum comprising the steps of:
   - selecting a semiconductor device having a high noise characteristic when operated in the avalanche mode;
   - biasing said device for operation in the avalanche mode to produce a high noise output;
   - quenching the noise output of the device by exposing the device to incident light energy;
   - and measuring the magnitude of the quenching of the noise output of the device as a measurement of said incident light energy.

2. The method of claim 1 wherein said semiconductor device is an avalanche diode.

* * * * *